United States Patent
Jiang (10) Patent No.: US 11,386,081 B2
(45) Date of Patent: Jul. 12, 2022

(54) SYSTEM AND METHOD FOR FACILITATING EFFICIENT INDEXING IN A DATABASE SYSTEM

(71) Applicant: Alibaba Group Holding Limited, Grand Cayman (KY)

(72) Inventor: Zhiyong Jiang, Beijing (CN)

(73) Assignee: Beijing Oceanbase Technology Co., LTD., Beijing (CN)

( * ) Notice: Subject to any disclaimer, the term of this patent is extended or adjusted under 35 U.S.C. 154(b) by 127 days.

(21) Appl. No.: 16/554,122

(22) Filed: Aug. 28, 2019

(65) Prior Publication Data
US 2020/0073863 A1  Mar. 5, 2020

(30) Foreign Application Priority Data

Aug. 31, 2018  (CN) .......................... 201811014383.2

(51) Int. Cl.
| | |
|---|---|
| *G06F 16/23* | (2019.01) |
| *G06F 16/245* | (2019.01) |
| *G06F 16/22* | (2019.01) |

(52) U.S. Cl.
CPC ........ *G06F 16/2379* (2019.01); *G06F 16/221* (2019.01); *G06F 16/2228* (2019.01); *G06F 16/2282* (2019.01); *G06F 16/245* (2019.01)

(58) Field of Classification Search
CPC .... G06F 16/2379; G06F 16/245; G06F 16/22; G06F 16/221; G06F 16/2228; G06F 16/2282; G06F 16/313; G06F 16/3334
See application file for complete search history.

(56) References Cited

U.S. PATENT DOCUMENTS

| | | | |
|---|---|---|---|
| 6,606,626 B1* | 8/2003 | Ponnekanti | G06F 16/2308 |
| 10,896,222 B1* | 1/2021 | Christodoulopoulos | G06F 16/2228 |
| 2003/0033275 A1* | 2/2003 | Alpha | G06F 16/316 |
| 2014/0317047 A1* | 10/2014 | Wang | G06F 12/0891 707/607 |
| 2016/0110439 A1* | 4/2016 | Hrle | G06F 16/273 707/600 |
| 2020/0034362 A1* | 1/2020 | Galitsky | G06F 16/24522 |

* cited by examiner

*Primary Examiner* — James E Richardson
(74) *Attorney, Agent, or Firm* — Shun Yao; Yao Legal Services, Inc.

(57) ABSTRACT

Embodiments described herein provide a system for facilitating efficient indexing in a database. The system can maintain a data table in the database. The data table includes a first column for structured data and a second column for unstructured text. A row of the data table can include a first piece of data in the first column and a second piece of data in the second column. During operation, the system performs word segmentation on the second piece of data to generate a first set of semantically meaningful word segments. The system then generates a set of index entries that corresponds to the row. A respective index entry includes an index generated from the first piece of data and a corresponding word segment of the first set of semantically meaningful word segments.

20 Claims, 11 Drawing Sheets

SYSTEM AND METHOD FOR FACILITATING EFFICIENT INDEXING IN A DATABASE SYSTEM

RELATED APPLICATION

Under 35 U.S.C. 119, this application claims the benefit and right of priority of Chinese Patent Application No. 201811014383.2, filed 31 Aug. 2018.

BACKGROUND

Field

This disclosure is generally related to the field of database management. More specifically, this disclosure is related to a system and method for facilitating efficient indexing in a database system.

Related Art

Indexing is a key feature of a database system for facilitating efficient retrieval of data from a database table. The table may include columns for different types of data, such as numeric values, structured data, character strings, unstructured phrases, etc. Typically, a database may use B+ tree indices for numeric values and structured data, such as a numeric identifier or a date. On the other hand, the database may use text phrases for character strings (i.e., text) and unstructured phrases, such as a name or a description of a product.

In a distributed system, such as an online transaction processing (OLTP) system, a database table can incorporate a variety of data types. For example, the table may include purchase details of online purchases. Such a table can include numeric values (identifiers), structured data (purchase date), and unstructured text (product descriptions). If a user's query for the table includes looking up in the unstructured text (e.g., whether the customer has purchased sports shoes of a certain brand within a certain period), B+ tree indices cannot entirely represent the query response. For such a query, typically, a database system may use B+ tree indices to determine a superset of results (e.g., to determine a date range). The database system can then traverse the superset of results with string matching operations on the unstructured text to determine the query response. However, this lookup process includes several iterative operations. As a result, if the number of records the database table is large, the lookup process can become time-intensive and inefficient.

Even though indexing has brought many desirable features to a database system, many problems remain unsolved in the lookup process based on mixed parameters.

SUMMARY

Embodiments described herein provide a system for facilitating efficient indexing in a database. The system can maintain a data table in the database. The data table includes a first column for structured data and a second column for unstructured text. A row of the data table can include a first piece of data in the first column and a second piece of data in the second column. During operation, the system performs word segmentation on the second piece of data to generate a first set of semantically meaningful word segments. The system then generates a set of index entries that corresponds to the row. A respective index entry includes an index generated from the first piece of data and a corresponding word segment of the first set of semantically meaningful word segments.

In a variation on this embodiment, the system can store the set of index entries in an index table of the database.

In a variation on this embodiment, the data table can include a third column for a primary key of the data table. A respective index entry of the set of index entries can then include a third piece of data of the third column of the row.

In a variation on this embodiment, the system determines a piece of structured data and an unstructured text phrase from a query with mixed parameters. The system then performs word segmentation on the unstructured text phrase to generate a second set of semantically meaningful word segments. Subsequently, the system determines query keys by querying the set of index entries based on a combination of the piece of structured data and a respective word segment of the second set of semantically meaningful word segments. The system then obtains a query response by looking up the query keys in the data table.

In a further variation, the system determines the query keys by obtaining a plurality of sets of lookup keys from the set of index entries and obtaining the query keys by determining an intersection of the plurality of sets of lookup keys. Here, a respective set of lookup keys corresponds to the piece of structured data and a corresponding word segment of the second set of semantically meaningful word segments.

In a variation on this embodiment, the system updates the row of the data table with a new piece of data by deleting a respective index entry of the set of index entries; generating a second set of index entries that corresponds to the row; and updating the row with the new piece of data. A respective index entry of the second set of index entries can include an index generated from the new piece of data and a corresponding word segment of the first set of semantically meaningful word segments.

In a variation on this embodiment, the system updates the row of the data table with a new piece of data and a new phrase of unstructured text by deleting a respective index entry of the set of index entries; performing word segmentation on the new phrase of unstructured text to generate a third set of semantically meaningful word segments; generating a third set of index entries that corresponds to the row; and updating the row with the new piece of data and the new phrase of unstructured text. A respective index entry of the third set of index entries can include an index generated from the new piece of data and a corresponding word segment of the third set of semantically meaningful word segments.

In a variation on this embodiment, the system deletes the row of the data table by deleting a respective index entry of the set of index entries and deleting the row from the data table.

In a variation on this embodiment, the second column is a target column that is frequently accessed by queries to the data table.

In a variation on this embodiment, the database system facilitates an online transaction processing (OLTP) service, and wherein the data table includes records of the OLTP service.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of facilitating indexing for a database table with mixed data types by (i) generating semantically-meaningful word segments from an unstructured text phrase; and (ii) for a respective word segment, generating an index entry for the word segment in combination with other structured data types. In this way, the database system can facilitate efficient database indexing and fast lookup for queries with mixed parameters.

With existing technologies, a database system in a distributed web environment (e.g., electronic commerce or e-commerce environment) typically facilitates OLTP services. The system usually supports indexing for efficiently responding to queries. For columns representing structured data, such as numeric values and structured strings, the system may use B+ tree indices to efficiently retrieve data from the columns. However, B+ tree indices may not be sufficient to represent columns representing unstructured text, such as product description or brand names. As a result, if a query involves both structured and unstructured data (such a combination can be referred to as mixed data) as parameters, the B+ tree indices cannot facilitate efficient data retrieval. In other words, the query parameters comprising mixed data cannot be used simultaneously in a single index. The term "unstructured text" can refer to one or more text phrases that do not follow a pattern or structure. For example, the description of a product can include any combination of phrases and hence, can be referred to as unstructured text.

The system may address this issue by maintaining B+ tree indices of the columns comprising structured data. The system may perform a two-step search to resolve a database query with mixed parameters (i.e., mixed data as parameters). First, the system may use the structured parameters of the query to retrieve a superset of the results (i.e., the results of the query and additional information) based on the B+ tree indices. The system can then perform string matching using the unstructured text parameters of the query on the unstructured text of the superset to retrieve the query response. However, this two-step data retrieval process is time-intensive and inefficient. Since such queries with mixed parameters can be frequent for a database system that supports a large-scale OLTP service, inefficient resolution of these queries significantly hinders the performance of the system.

To solve this problem, embodiments described herein provide a database system that can facilitate an efficient indexing process for a table with columns of mixed data, thereby efficiently resolving queries with mixed parameters. Suppose that the system maintains a database instance, which can also be referred to as a database, that stores data associated with the OLTP service. The database can include a data table that includes columns comprising structured data and at least one text column comprising unstructured text. For example, the data table can represent purchase history for a distributed web environment. The data table can then include columns for structured data, such as order identifier, customer identifier, and purchase date, and at least one text column for order name, which can include the product description and/or brand of the product.

To generate the index for a row or a data entry of the data table, the system generates a respective semantically meaningful word segment from the unstructured text phrase in the text column of the row. For each of the word segment, the system can combine the data in the frequently accessed columns, which can be referred to as the target columns, of the row and the word segment to generate an index entry. This index entry can include indices for each of the target columns as well as the word segment. As a result, the system generates a set of index entries for the entry, each index entry corresponding to one of the word segments. Consequently, if the system receives a query with mixed parameters, the database system can match the mixed parameters to at least one of the set of index entries. The matched index entry can then point to the data entry corresponding to the mixed parameters.

In some embodiments, upon generating the index entries, the system can store the indices in an index table. The index entries then become corresponding rows of the index table. This index table can be stored in the same database instance that includes the data table or in a separate database instance of the database system. The index table can store each of the set of entries in association with one or more lookup keys (e.g., primary keys) of the row of the data table. Upon receiving a query with the mixed parameters, the system can match one or more index entries in the index table based on the mixed parameters, and retrieve the associated lookup keys. The system then uses the lookup keys to retrieve the entries from the data table. In this way, the system can facilitate efficient lookup for queries with mixed parameters.

Exemplary System

Figure 1A:
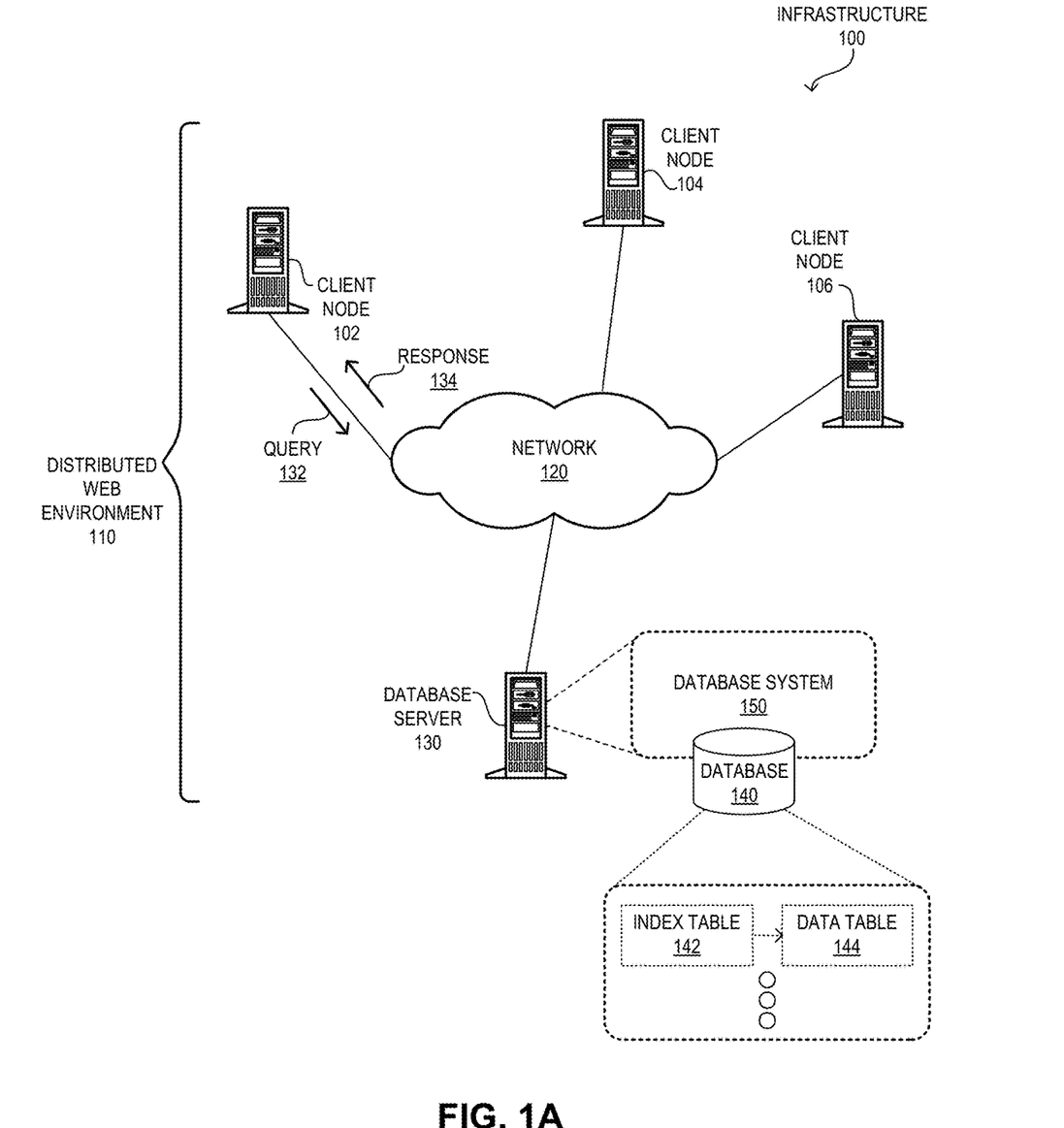
FIG. 1A illustrates an exemplary infrastructure with efficient database indexing support for mixed data types, in accordance with an embodiment of the present application.

FIG. 1A illustrates an exemplary infrastructure with efficient database indexing support for mixed data types, in accordance with an embodiment of the present application. In this example, an infrastructure 100 can include a distributed web environment 110. Environment 110 can facilitate a large-scale OLTP service, such as an e-commerce service. Environment 110 can serve a number of client nodes (or client-serving machines) 112, 114, and 116, and a database server 130. Database server 130 can facilitate the OLTP service to client nodes 112, 114, and 116, and communicate with the client nodes via a network 120 (e.g., a local or a wide area network, such as the Internet). Database server 116 can include components such as a number of central processing unit (CPU) cores, a system memory (e.g., a dual in-line memory module), a network interface card (NIC), and a number of storage devices/disks. Database server 130 can run a database system 150 (e.g., a database management system (DBMS)) for supporting OLTP service in environment 110.

System 150 can run a database 140 that stores data associated with the OLTP service of environment 110. Database 140 can include a data table 144 that includes columns for structured data and at least one text column for unstructured text. For example, if environment 110 provides an e-commerce service, table 144 can represent the purchase history of the service. Table 144 can then include columns for structured data, such as an order identifier, a customer identifier, and the purchase date, and at least one text column for order name, which can include the product description and/or brand of the product.

With existing technologies, system 150 usually supports indexing for efficiently responding to queries to table 144. For columns representing structured data, system 150 may use B+ tree indices to retrieve data from the columns efficiently. However, B+ tree indices may not be sufficient to represent the column representing unstructured text. Suppose that system 150 receives a query 132 from client node 102 via network 120 for information stored in table 144. This query can be generated from a website (e.g., running on a browser) or an application, which facilitates the e-commerce service to a client. Query 132 can include mixed parameters that include both structured and unstructured data types.

However, the B+ tree indices cannot facilitate efficient data retrieval for query 132 from table 144 since a query with mixed parameters cannot be represented in a single index. To address this issue, system 150 may maintain B+ tree indices of the columns comprising structured data. System 150 may perform a two-step search to resolve query 132. First, system 150 may use the structured parameters of query 132 to retrieve a superset of the results from table 144 based on the B+ tree indices. System 150 can then perform string matching using the unstructured text parameter of query 132 on the unstructured text of the superset to determine the response to query 132. However, this two-step data retrieval process is time-intensive and inefficient. Since such queries with mixed parameters can be frequent for system 150, inefficient resolution of these queries significantly hinders the performance system 150.

To solve this problem, system 150 can facilitate an efficient indexing process for table 144, thereby resolving query 132 with a low response time. During operation, system 150 can determine a respective semantically meaningful word segment from the unstructured text phrase in the text column of the row. In some embodiments, system 150 can use artificial intelligence (AI) techniques, such as natural language processing (NLP), to determine the semantically meaningful phrases. In some further embodiments, system 150 can tokenize the phrases of the text phrase and determine whether a respective token, by itself or in combination with other tokens, can yield a meaningful phrase. For example, system 150 can eliminate conjunctions from the unstructured text as noise elimination while determining the semantically meaningful word segments.

For each of the word segments, system 150 can combine respective indices of the data in the target columns of the row and the word segment to generate an index entry. This index entry can include indices for each of the target columns as well as the word segment. The index entry can also include the primary key of the row of table 144. In this way, system 150 generates a set of index entries for the row of table 144. Each of the index entries can correspond to one of the word segments. Consequently, when system 150 receives query 132 with mixed parameters, system 150 can match the mixed parameters to at least one of the index entries. The matched index entry can then point to the row corresponding to the mixed parameters in table 144.

In some embodiments, upon generating the index entries, system 150 can store the index entries in an index table 142. Index table 142 can be stored in the same database instance 140 or a separate database instance of system 150. Index table 142 can store each of the entries in association with the primary key of the row of table 144. Upon receiving query 132, system 150 can match one or more index entries in index table 142 based on the mixed parameters of query 132. System 150 can then retrieve the associated primary key and use the primary key to retrieve the corresponding row from table 144. In this way, system 150 can facilitate efficient lookup in table 142 for queries with mixed parameters. System 150 can then generate a query response 134 comprising the result of the lookup and send response 134 to client node 102.

Figure 1B:
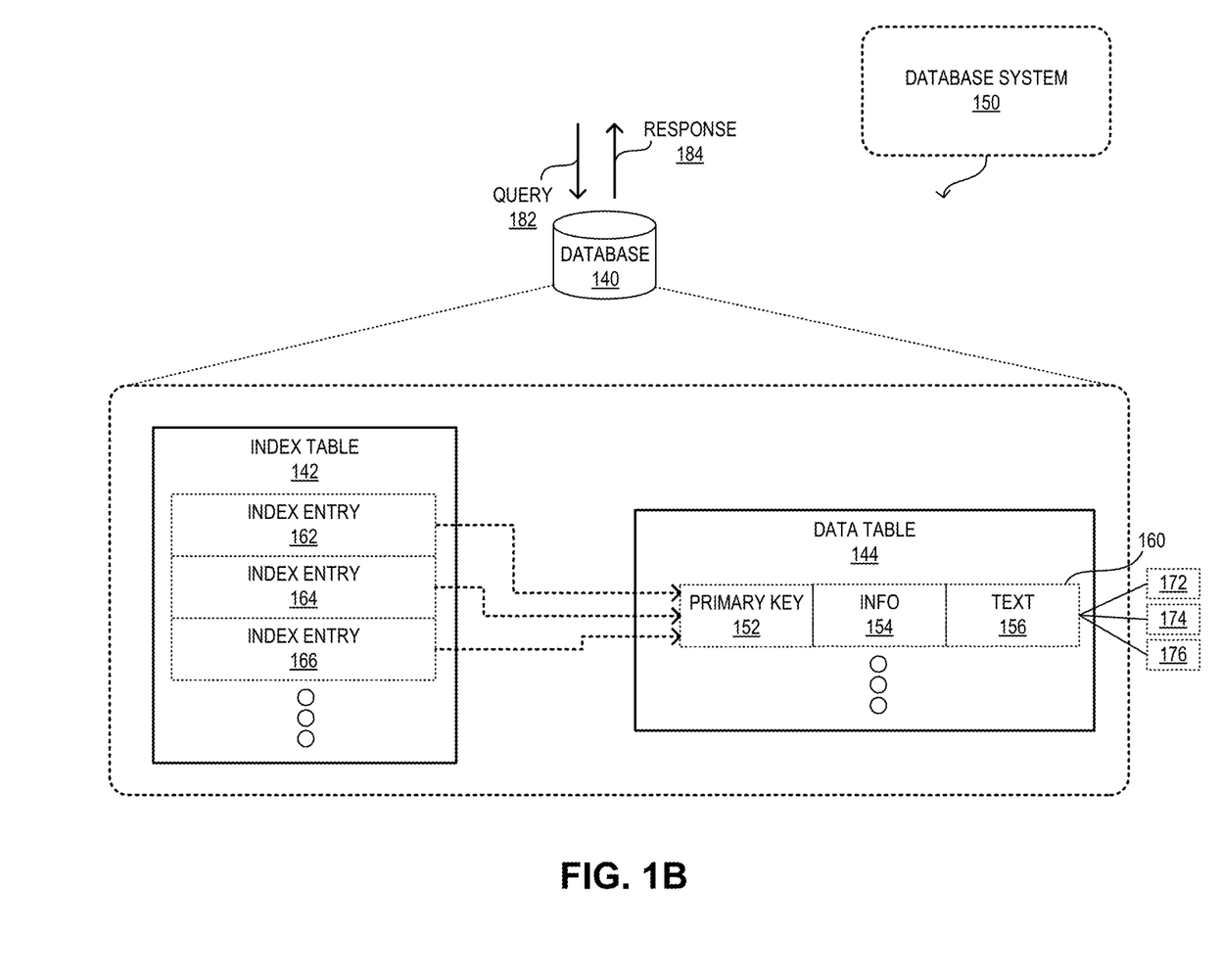
FIG. 1B illustrates an exemplary efficient database indexing for facilitating indices for mixed data types, in accordance with an embodiment of the present application.

FIG. 1B illustrates an exemplary efficient database indexing for facilitating indices for mixed data types, in accordance with an embodiment of the present application. Suppose that table 144 includes a row 160 that stores mixed data. The structured data portion of the mixed data can include a primary key 152 and additional information 154. The unstructured data can include text 156. In this example, information 154 can be the target column for row 160. To facilitate efficient indexing, system 150 first generates semantically meaningful word segments 172, 174, and 176 from text 156. System 150 can also generate an index (e.g., a B+ tree index) of information 154. For each of the word segments of text 156, system 150 can combine the index of information 154 and the word segment to generate an index entry in table 142 (i.e., in a row in table 142).

For example, system 150 can generate an index entry 162 in table 142 for a word segment 172. Index entry 162 can include the index generated from information 154, word segment 172 of text 156, and primary key 152. In this way, system 150 can generate index entries 162, 164, and 166 in table 142, comprising word segments 172, 174, and 176, respectively. Each of these entries further includes the index generated from information 154 and primary key 152. Since each of index entries 162, 164, and 166 includes primary key 152, index entries 162, 164, and 166 correspond to the same row 160 in table 144. Upon receiving a query 182 with mixed parameters, system 150 can match one or more of index entries 162, 164, and 166 based on the mixed parameters of query 182. System 150 can then retrieve primary key 152 from the one or more entries, and use primary key 152 to retrieve corresponding row 160 from table 144. System 150 can then resolve query 182 from row 160 and provide a query response 184 comprising the result of the resolution.

Exemplary Index Generation and Lookup

Figure 2:
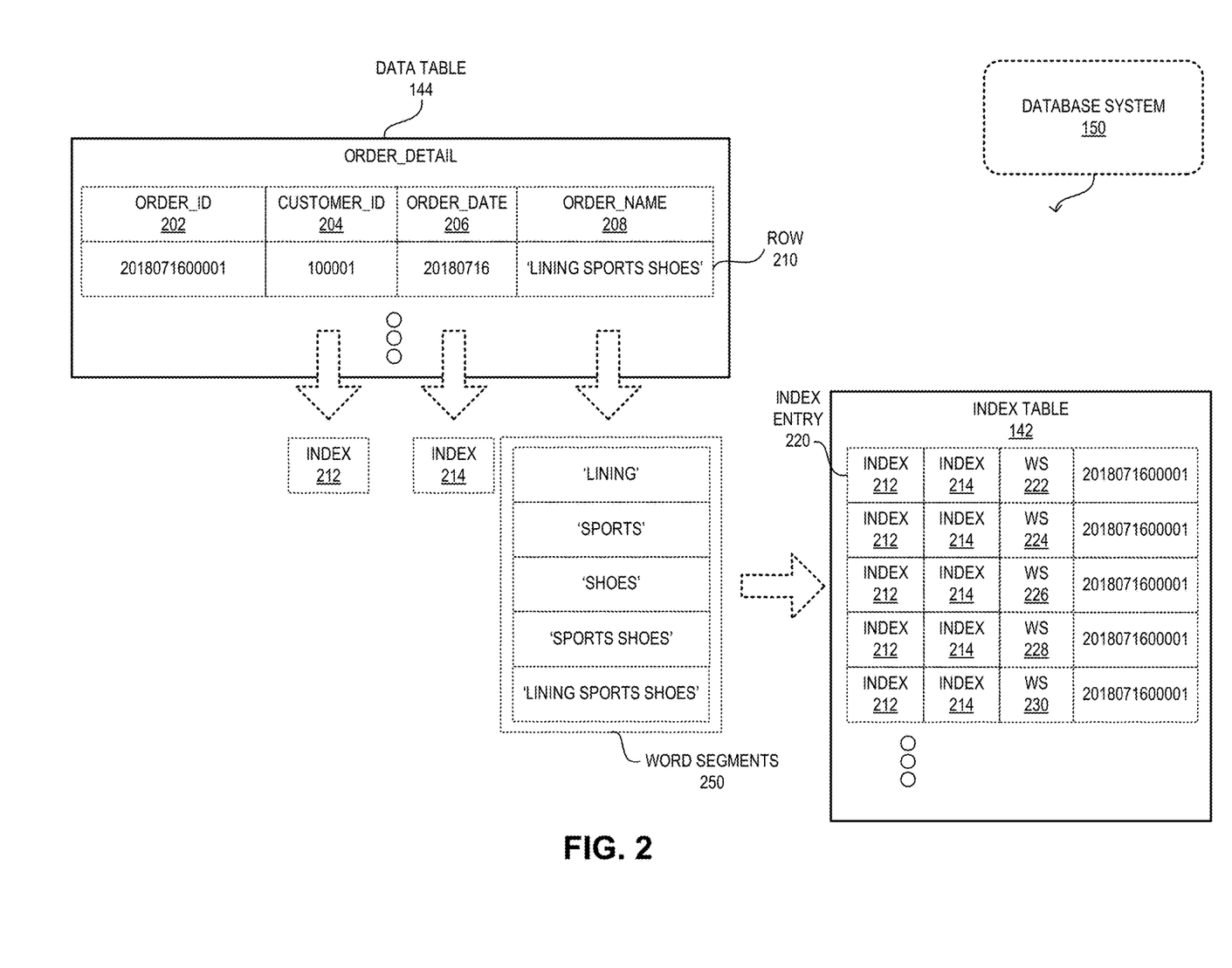
FIG. 2 illustrates an exemplary index generation process for facilitating efficient database indexing, in accordance with an embodiment of the present application.

FIG. 2 illustrates an exemplary index generation process for facilitating efficient database indexing, in accordance with an embodiment of the present application. In this example, table 144 can be an "Order_Detail" table that stores information associated with the purchases conducted by customers. In some embodiments, table 144 can be created by system 150 in response to a database command (e.g., a "Create table" command in Structured Query Language (SQL)). Table 144 can include four columns: Order_ID (identifier) 202, Customer_ID 204, Order_Date 206, and Order_Name 208. Columns 202, 204, 206, and 206 can be in integer, string, date, and string data types, respectively, and can represent the order identifier (the primary key in table 144), user identifier, order date, and the name/description of the purchased product, respectively.

Suppose that table 144 includes a row 210 with values for columns 202, 204, 206, and 206 as '2018071600001,' '100001,' '20180716,' and 'Lining Sports Shoes,' respectively. A typical query for table 144 can be a user querying about his/her the orders within a certain period/timeframe or orders that include a certain brand of product. Therefore, the target columns for table 144 can be column 204 (i.e., to identify the user), column 206 (i.e., to determine the date of the purchase), and column 208 (i.e., to determine the product type/brand). However, since column 208 can include any text, column 208 can represent unstructured text.

To generate an index for row 210, system 150 first performs word segmentation on the phrase 'Lining Sports Shoes' to determine semantically meaningful word segments 250. Word segments 250 can include word segments 222, 224, 226, 228, and 230 representing 'Lining,' 'Sports,' 'Shoes,' 'Sports Shoes,' and 'Lining Sports Shoes,' respectively. System 150 can discard the phrases that do not have a semantic meaning with respect to the phrase 'Lining Sports Shoes,' such as 'Lining Sports.' System 150 also generates indices 212 and 214 for target columns 204 and 206, respectively. For each of word segments 222, 224, 226, 228, and 230, system 150 creates an index entry in index table 142. Each of the index entries includes one of the word segments, indices 212 and 214, and the primary key. For example, index entry 220 can include indices 212 and 214, word segment 222 ('Lining'), and primary key '2018071600001.'

Since the same phrase 'Lining Sports Shoes' in column 208 of row 210 can be segmented into five word segments 222, 224, 226, 228, and 230, table 142 can include five index entries corresponding to the same row 210. Therefore, unlike conventional indexing, a single row in table 144 can correspond to multiple index entry rows in index table 142. Since each of these five index entry rows of table 144 includes the same primary key '2018071600001' of row 210, each of the index entry rows points to the same row 210. As a result, even if the user searches for any of the word segments, such as 'Shoes,' the resultant indexing process would point to row 210 because the purchase record in row 210 is relevant to shoes.

If the data associated with row 210 is updated with new data, but column 208 remains unchanged, system 150 first generates word segments 250 from column 208. System 150 can then generate a respective query key based on indices 212 and 214, primary key '2018071600001,' and a corresponding word segment of word segments 250. Using each of the query keys, the system locates the corresponding index entry in table 142 and deletes the index entry (i.e., deletes the corresponding row in table 142). System 150 can then update row 210 using the new data and regenerate the index entries based on the new data. However, system 150 can reuse word segments 250 for the index entries since column 208 is unchanged. For example, if the customer ID in column 204 of row 210 is updated, the corresponding index 212 is updated. Consequently, a respective one of the new index entries would include the updated index 212, previous index 214, and a corresponding word segment of word segments 250.

On the other hand, if the new data also includes updates to the data in column 208 of row 210, system 150 can generate a new set of word segments and generate the index entries based on the new set of word segments. As a result, a respective one of the new index entries would include the updated index 212, previous index 214, and one of the new word segments. Moreover, to delete row 210, system 150 can generate a respective query key based on indices 212 and 214, primary key '2018071600001,' and a respective one of word segments 250. Using each of the query keys, the system locates the corresponding index entry in table 142 and deletes the index entry. System 150 can then delete row 210 from table 144.

Figure 3:
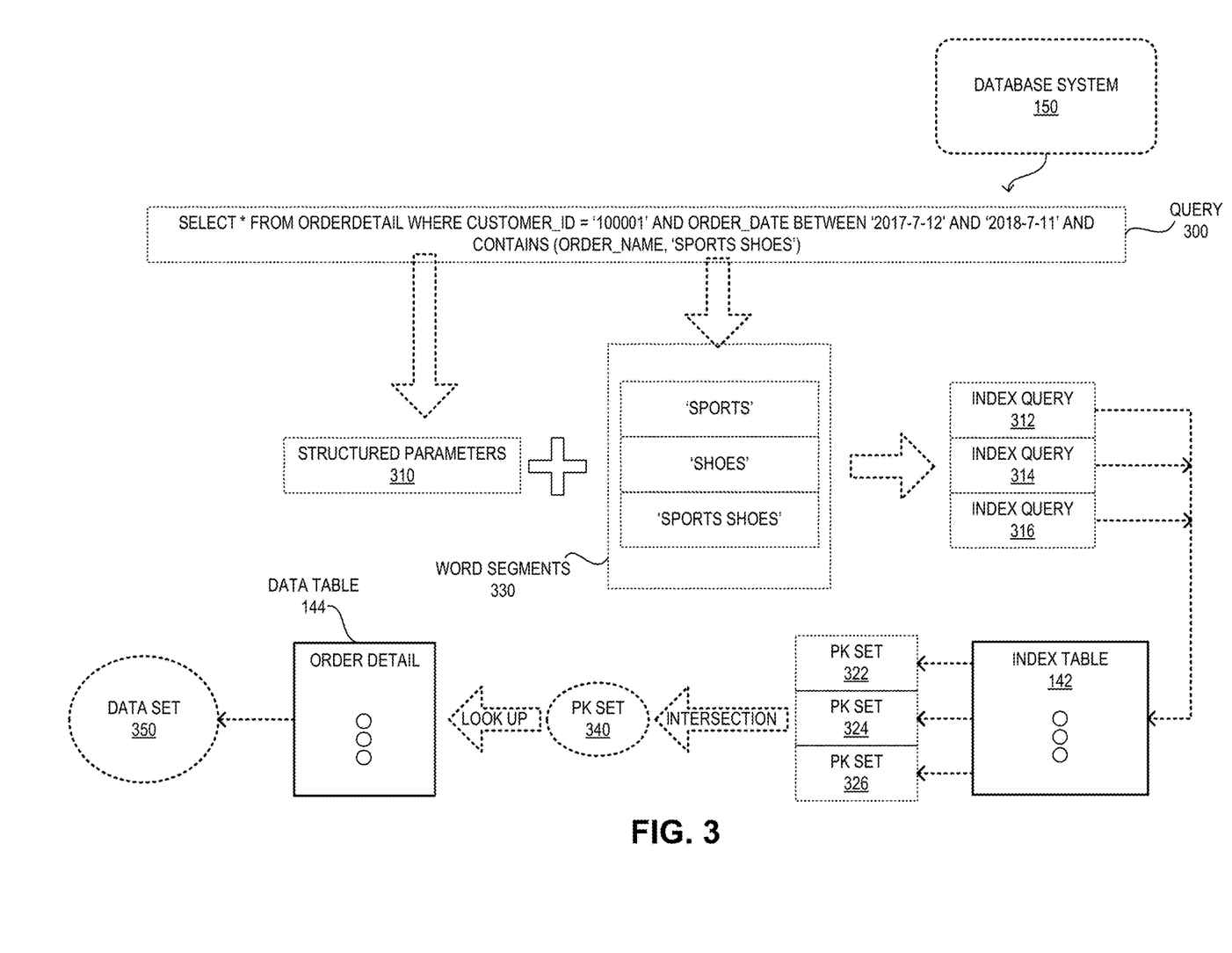
FIG. 3 illustrates an exemplary lookup process based on efficient database indexing, in accordance with an embodiment of the present application.

FIG. 3 illustrates an exemplary lookup process based on efficient database indexing, in accordance with an embodiment of the present application. During operation, system 150 receives a query 300 (e.g., an SQL query) for table 144. Suppose that query 300 includes the following query statement: "select * from Order_Detail where Customer_ID='1000111' and Order_Date between '2017-7-12' and '2018-7-11' and contains (Order_Name, 'Lining Shoes')." To resolve query 300, system 150 determines that query 300 includes mixed parameters. From query 300, system 150 can determine structured parameters 310, which indicate that the customer ID is "1000111," and the order date is between "7-12-2017" and "7-11-2018." System 150 also determines that query 300 includes unstructured text comprising the phrase 'Lining Shoes.'

To resolve query 300, system 150 first generates a set of semantically meaningful word segments 330 from the phrase 'Lining Shoes.' Word segments 330 can include phrases 'Lining,' 'Shoes,' and 'Lining Shoes.' System 150 then uses structured parameters 310 and a respective one of word segments 330 to generate a corresponding index query. For the three word segments in word segments 330, system 150 can generate index queries 312, 314, and 316, respectively. System 150 then queries index table 142 based on each of index queries 312, 314, and 316, thereby issuing three index queries to table 142.

Since each index entry in table 142 includes a primary key of a row in table 144, an index query to table 142 returns a set of primary keys that matches the structured parameters and the word segment of the index query. Consequently, based on each of index queries 312, 314, and 316, system 150 can retrieve a corresponding set of primary keys. For example, by issuing index query 312 to table 142, system 150 retrieves a set of primary keys 322 that matches structured parameters 310 and the phrase 'Lining' in table 142. Similarly, system 150 retrieves sets of primary keys 324 and 326 by issuing index queries 314 and 316, respectively, to table 142.

System 150 then performs an intersection of sets of primary keys 322, 324, and 326 to obtain a set of primary keys 340. The set intersection operation can remove the repeated primary keys. Therefore, set of primary keys 340 can include unique primary keys of table 144. Here, set of primary keys 340 can be the set of query keys that can be used to query table 144. Consequently, system 150 performs a lookup in table 144 using set of primary keys 340 to obtain data set 350. Since database tables are usually indexed using primary keys, system 150 can efficiently execute the lookup operation based on set of primary keys 340. System 150 then generates a query response based on data set 350. Since query 300 includes a "select*" statement, system 150 may provide data set 350 as the query response.

However, if the query statement seeks specific column information, system 150 may extract a subset of data from data set 350 that corresponds to the query statement. For example, if a query includes a "select Order_Date" statement, system 150 may extract the order dates from data set 350 and provide the order dates as the query response. In this way, system 150 can use efficient database indexing to resolve queries with mixed parameters.

Operations

Figure 4A:
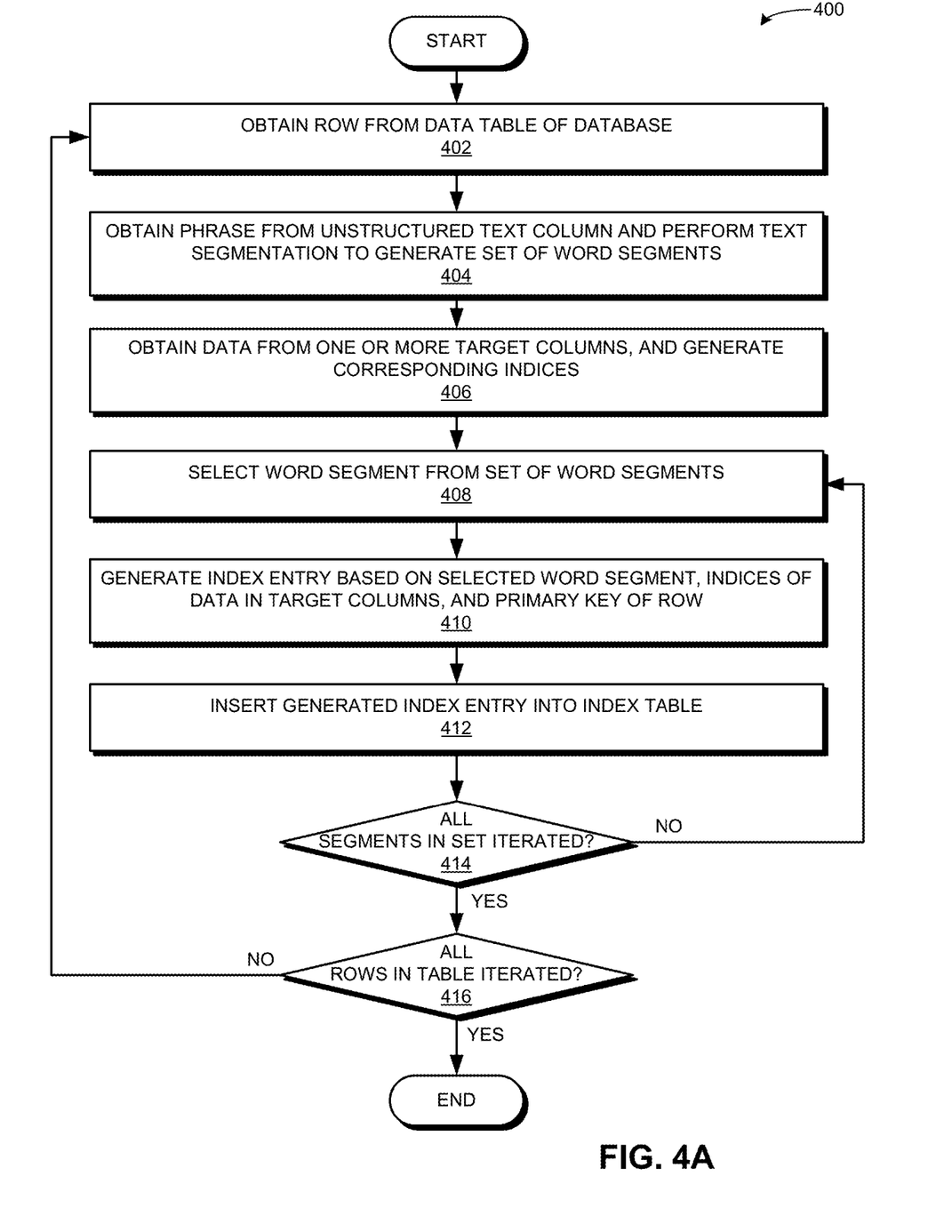
FIG. 4A presents a flowchart illustrating a method of a database system generating indices for mixed data types for facilitating efficient database indexing, in accordance with an embodiment of the present application.

FIG. 4A presents a flowchart illustrating a method of a database system generating indices for mixed data types for facilitating efficient database indexing, in accordance with an embodiment of the present application. During operation, the system obtains a row from a data table of a database (operation 402). The system then obtains the phrase from the unstructured text column of the row and performs text segmentation to generate a set of word segments (operation 404). The set of word segments can include semantically meaningful sub-phrases of the obtained phrase, as described in conjunction with FIG. 2. The system then obtains the data in one or more target columns of the row (i.e., the column values of the row) and generates corresponding indices (operation 406).

Subsequently, the system selects a word segment from the set of word segments (operation 408) and generates an index entry based on the selected word segment, the indices of the data in the target columns, and the primary key of the row (operation 410). The system then inserts the generated index entry into the index table (operation 412) (i.e., in a row of the index table). The system then determines whether all word segments in the set of word segments have been iterated (operation 414). If all word segments have not been iterated, the system continues to select a word segment from the set of word segments (operation 408). If all word segments have been iterated, the system determines whether all rows in the table have been iterated (operation 416). If all rows have not been iterated, the system continues to obtain the next row from the data table (operation 402). On the other hand, if rows have been iterated, the index generation process is complete.

Figure 4B:
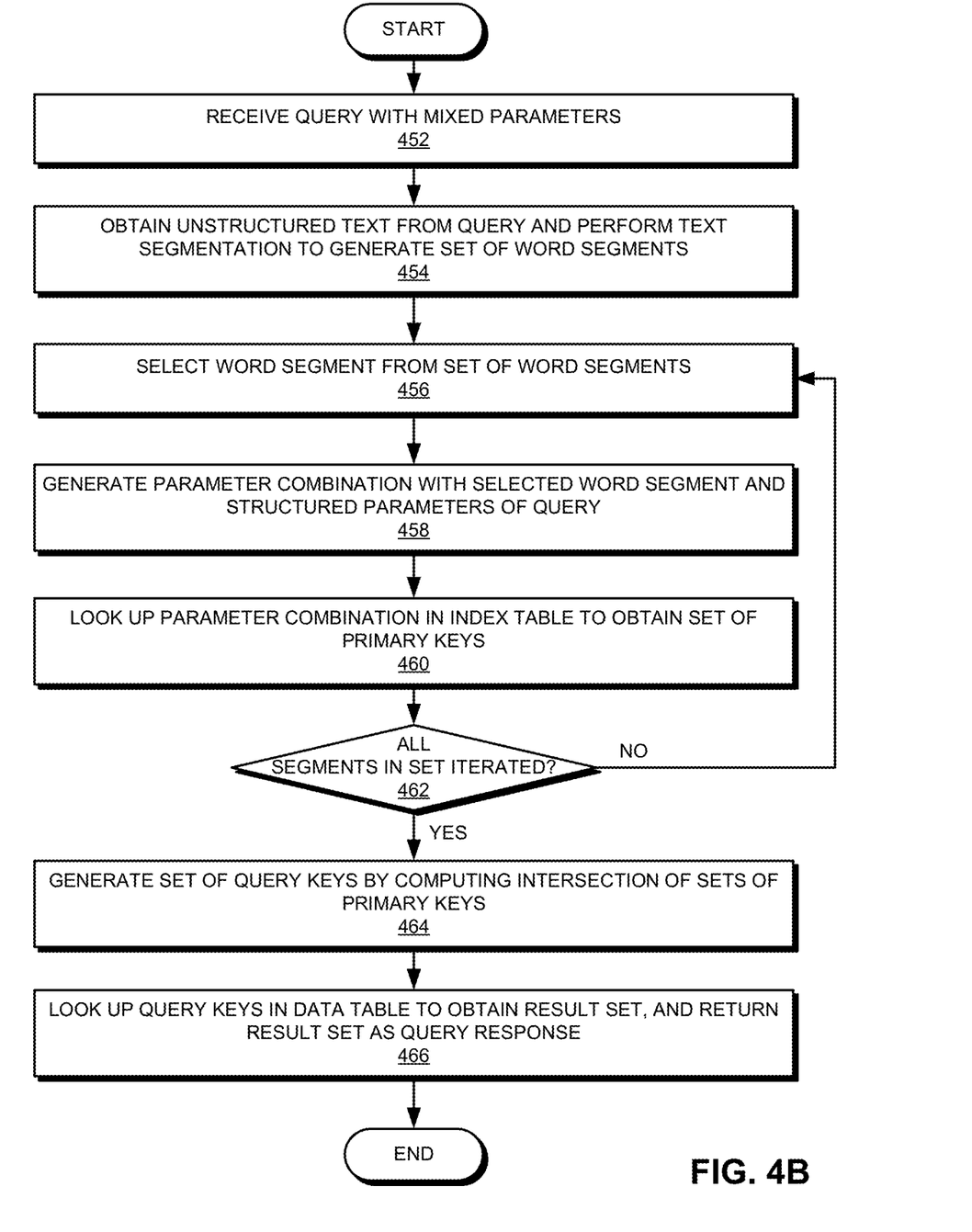
FIG. 4B presents a flowchart illustrating a method of a database system looking up in a data table based on efficient database indexing, in accordance with an embodiment of the present application.

FIG. 4B presents a flowchart illustrating a method of a database system looking up in a database table based on efficient database indexing, in accordance with an embodiment of the present application. During operation, the system receives a query with mixed parameters (operation 452). The system then obtains the unstructured text from the query and performs text segmentation to generate a set of word segments (operation 454). Subsequently, the system selects a word segment from the set of word segments (operation 456), and generates a parameter combination with the selected word segment and other structured parameters of the query (operation 458).

The system then looks up the parameter combination in the index table to obtain a set of primary keys (operation 460). The system determines whether all word segments in the set of word segments have been iterated (operation 462). If all word segments have not been iterated, the system continues to select a word segment from the set of word segments (operation 456). If all word segments have been iterated, the system generates a set of query keys by computing an intersection of the sets of primary keys (operation 464). The system then looks up the set of query keys in the data table to obtain a result set and can return the result set as the query response (operation 466).

Figure 5A:
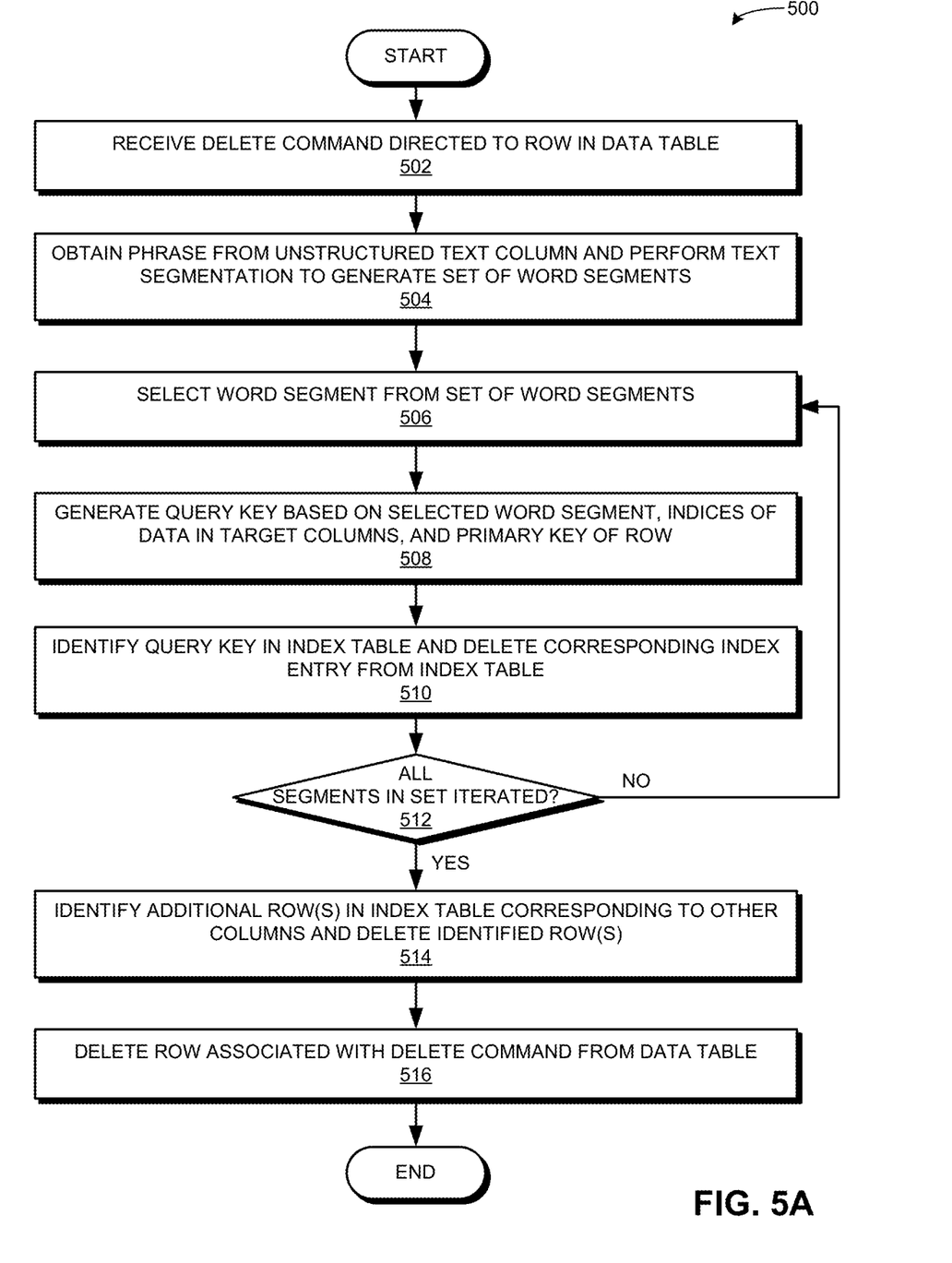
FIG. 5A presents a flowchart illustrating a method of a database system performing a delete operation that incorporates efficient database indexing, in accordance with an embodiment of the present application.

FIG. 5A presents a flowchart illustrating a method of a database system performing a delete operation that incorporates efficient database indexing, in accordance with an embodiment of the present application. During operation, the system receives a delete command (e.g., a delete statement in SQL) directed to a row in a data able (operation 502). The system obtains the phrase from the unstructured text column of the row and performs text segmentation to generate a set of word segments (operation 504). The system then selects a word segment from the set of word segments (operation 506), and generates a query key based on the selected word segment, the indices of the data in the target columns of the row, and the primary key of the row (operation 508).

Subsequently, the system identifies the query key in the index table and deletes the corresponding index entry (i.e., the corresponding row) from the index table (operation 510). The system determines whether all word segments in the set of word segments have been iterated (operation 512). If all word segments have not been iterated, the system continues to select a word segment from the set of word segments (operation 506). If all word segments have been iterated, the system identifies the additional row(s) in the index table, if any, corresponding to other columns and deletes the identified row(s) (operation 514). The system then deletes the row associated with the delete command from the data table (operation 516).

Figure 5B:
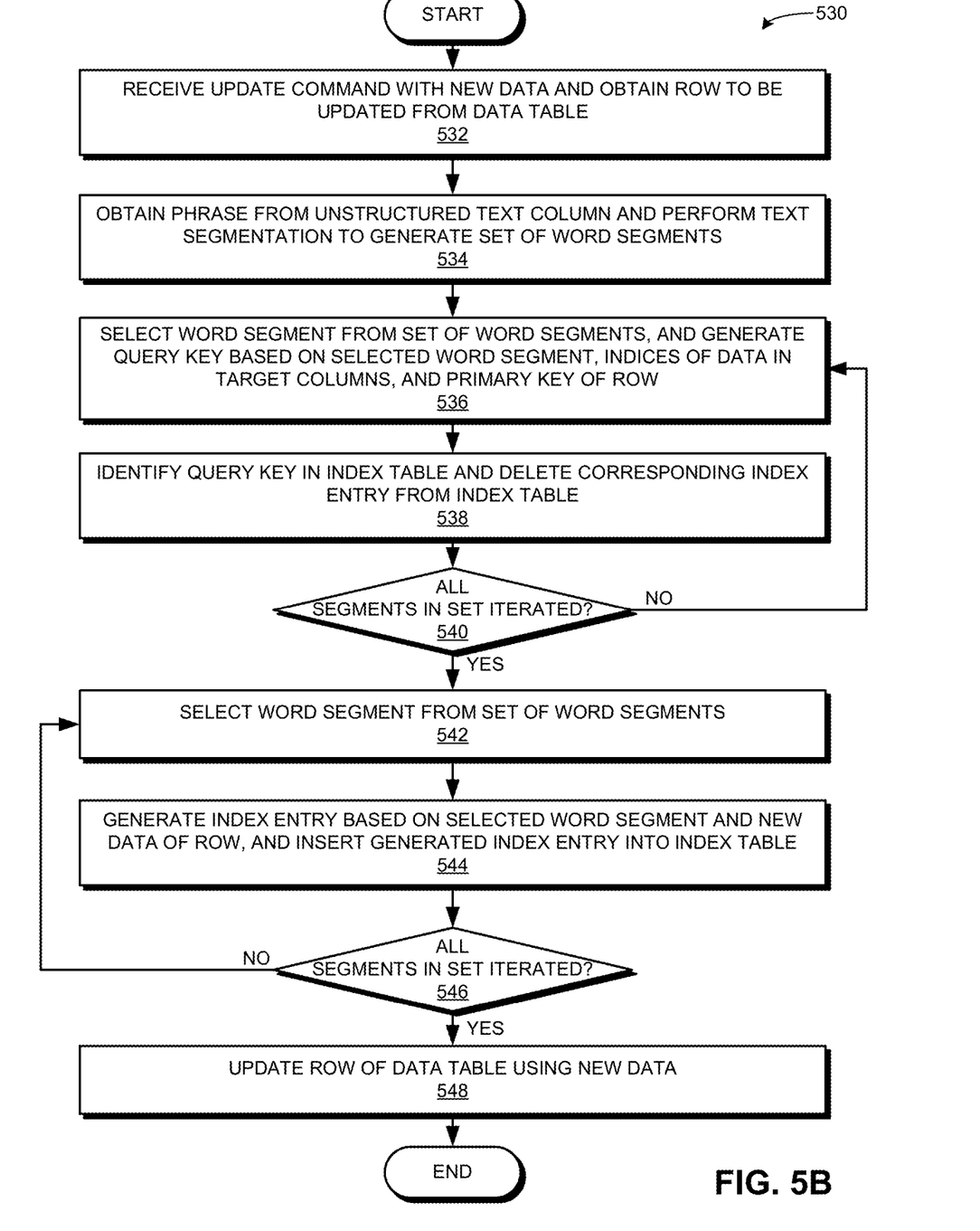
FIG. 5B presents a flowchart illustrating a method of a database system performing an update operation that incorporates efficient database indexing, in accordance with an embodiment of the present application.

FIG. 5B presents a flowchart illustrating a method of a database system performing an update operation that incorporates efficient database indexing, in accordance with an embodiment of the present application. During operation, the system receives an update command (e.g., an update statement in SQL) with new data and obtains the row to be updated from the data table (operation 532). The system obtains the phrase from the unstructured text column of the row and performs text segmentation to generate a set of word segments (operation 534).

The system then selects a word segment from the set of word segments, and generates a query key based on the selected word segment, the indices of the data in the target columns of the row, and the primary key of the row (operation 536). Subsequently, the system identifies the query key in the index table and deletes the corresponding index entry (i.e., the corresponding row) from the index table (operation 538). The system determines whether all word segments in the set of word segments have been iterated (operation 540). If all word segments have not been iterated, the system continues to select a word segment from the set of word segments (operation 536). If all word segments have been iterated, the system initiates the updating process by selecting a word segment from the set of word segments (operation 542).

The system then generates an index entry based on the selected word segment and the new data (e.g., the indices of the updated values in the target columns, and/or the updated primary key of the row), and inserts the generated index entry into the index table (operation 544). Subsequently, the system determines whether all word segments in the set of word segments have been iterated (operation 546). If all word segments have not been iterated, the system continues to select a word segment from the set of word segments (operation 542). If all word segments have been iterated, the system updates the row of the data table using the new data (operation 548).

Figure 5C:
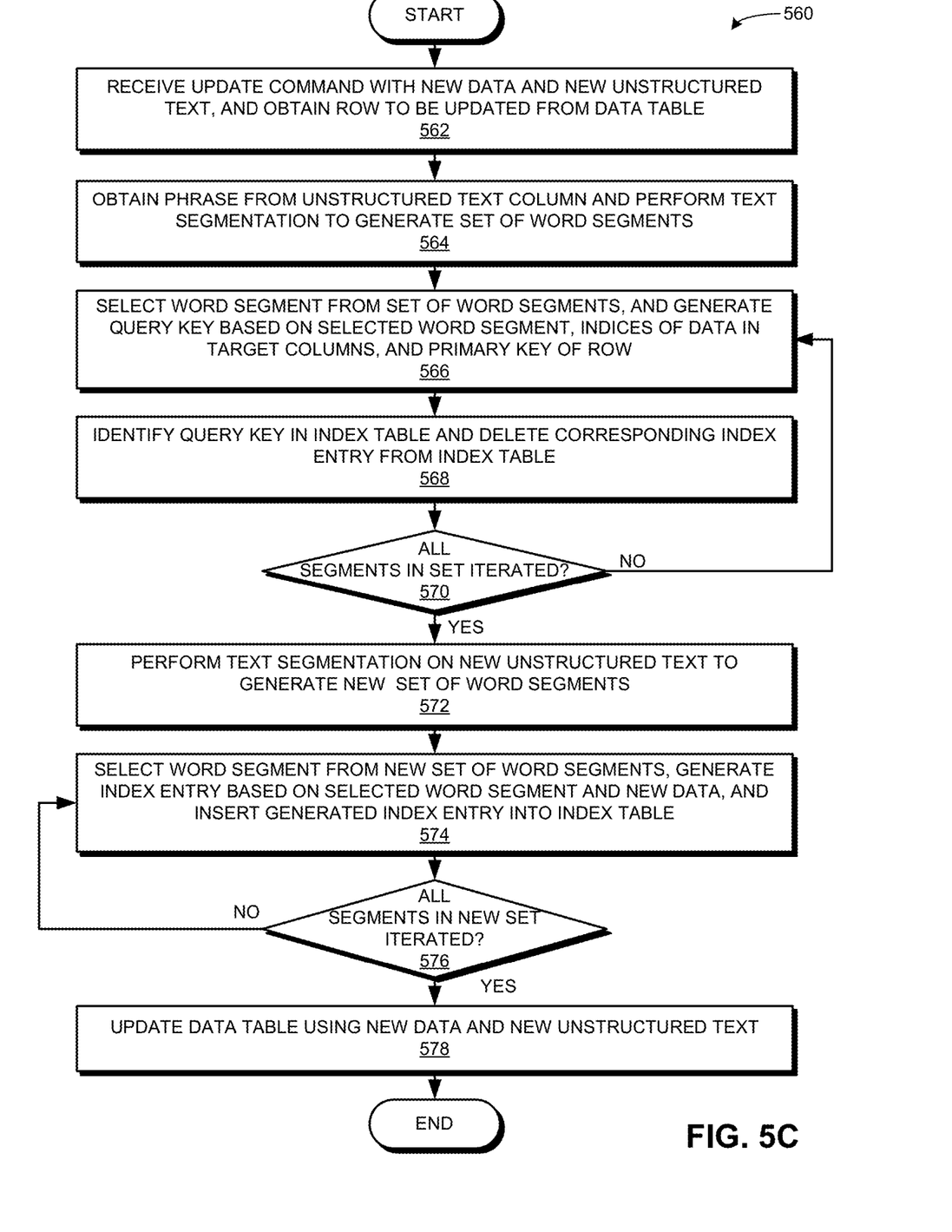
FIG. 5C presents a flowchart illustrating a method of a database system performing an update operation that includes new text and incorporates efficient database indexing, in accordance with an embodiment of the present application.

FIG. 5C presents a flowchart illustrating a method of a database system performing an update operation that includes new text and incorporates efficient database indexing, in accordance with an embodiment of the present application. During operation, the system receives an update command (e.g., an update statement in SQL) with new data and new unstructured text, and obtains the row to be updated from the data table (operation 562). The system obtains the phrase from the unstructured text column of the row and performs text segmentation to generate a set of word segments (operation 564).

The system then selects a word segment from the set of word segments, and generates a query key based on the selected word segment, the indices of the values in the target columns of the row, and the primary key of the row (operation 566). Subsequently, the system identifies the query key in the index table and deletes the corresponding index entry (i.e., the corresponding row) from the index table (operation 568). The system determines whether all word segments in the set of word segments have been iterated (operation 570). If all word segments have not been iterated, the system continues to select a word segment from the set of word segments (operation 566).

If all word segments have been iterated, the system performs text segmentation on the new unstructured text to generate a new set of word segments (operation 564). Subsequently, the system selects a word segment from the new set of word segments, generates an index entry based on the selected word segment and the new data, and inserts the generated index entry into the index table (operation 574). The system then determines whether all word segments in the new set of word segments have been iterated (operation 576). If all word segments have not been iterated, the system continues to select a word segment from the new set of word segments (operation 574). If all word segments have been iterated, the system updates the row of the data table using the new data and the new unstructured text (operation 578).

Exemplary Computer System and Apparatus

Figure 6:
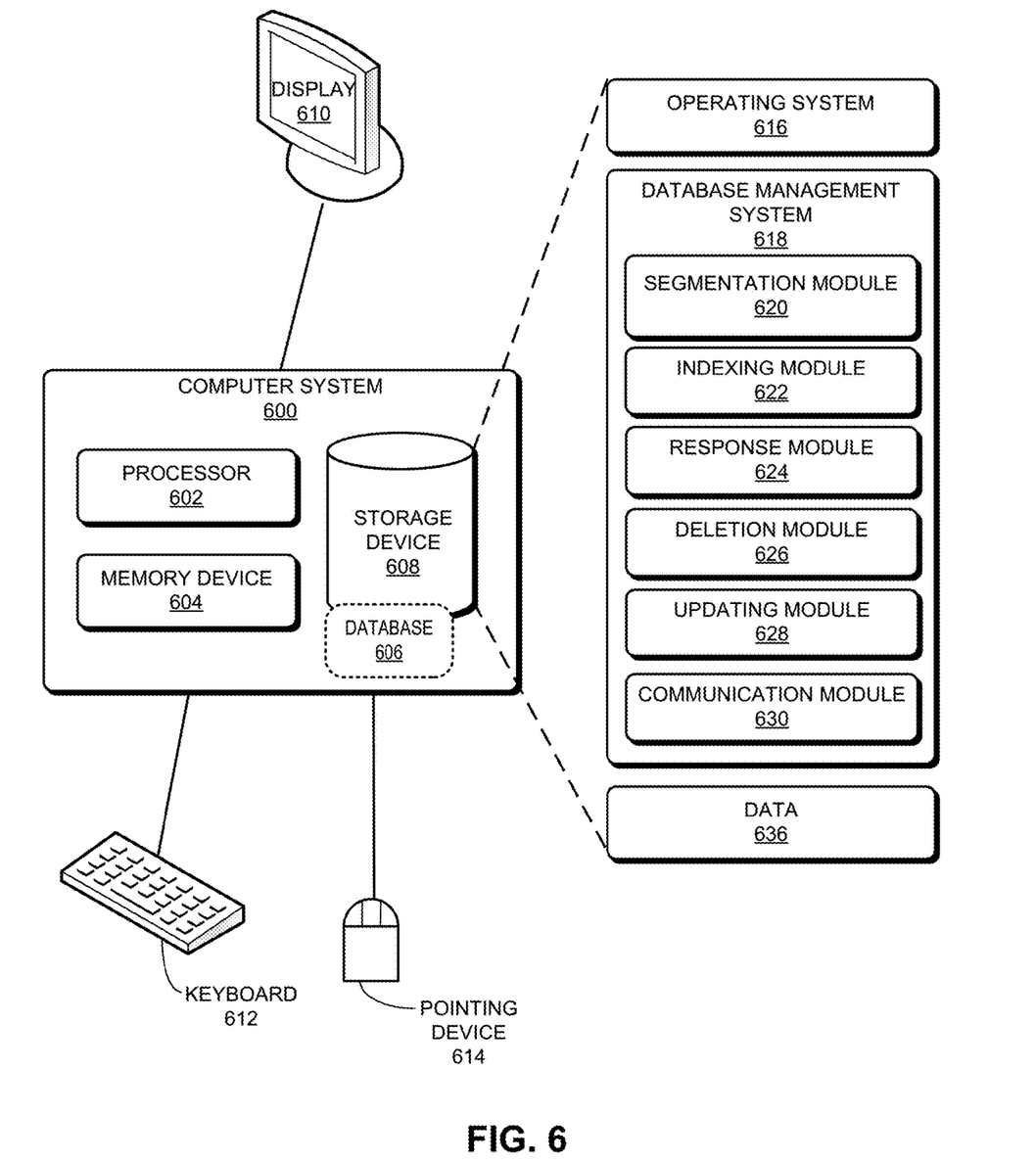
FIG. 6 illustrates an exemplary computer system that facilitates efficient database indexing for mixed data types, in accordance with an embodiment of the present application.

FIG. 6 illustrates an exemplary computer system that facilitates efficient database indexing for mixed data types, in accordance with an embodiment of the present application. Computer system 600 includes a processor 602, a memory device 604, and a storage device 608. Memory device 604 can include volatile memory (e.g., a dual in-line memory module (DIMM)). Furthermore, computer system 600 can be coupled to a display device 610, a keyboard 612, and a pointing device 614. Storage device 608 can be a hard disk drive (HDD) or a solid-state drive (SSD). Storage device 608 can store an operating system 616, a database management system 618, and data 636. Database management system 618 can maintain a database 606 in storage device 608. Database management system 618 can facilitate the operations of database system 150.

Database management system 618 can include instructions, which when executed by computer system 600 can cause computer system 600 to perform methods and/or processes described in this disclosure. Specifically, Database management system 618 can include instructions for performing word segmentation (e.g., based on NLP) on the unstructured text in a table of database 606 and/or in a query directed to database 606 (segmentation module 620). Database management system 618 can also include instructions for generating indices for the target columns of the table in database 606 (indexing module 620). Furthermore, database management system 618 includes instructions for generating index entries in an index table of database 606 (indexing module 620).

Database management system 618 can also include instructions for responding to queries to database 606 (e.g., queries with mixed parameters) based on the index entries (response module 622). Moreover, database management system 618 includes instructions for deleting a row from the table in database 606 and the corresponding index entries (deletion module 624). Database management system 618 further includes instructions for updating a row from the table in database 606 and the corresponding index entries (updating module 626). Database management system 618 may further include instructions for sending and receiving messages (communication module 630). Data 636 can include any data that can facilitate the operations of database management system 618, such as data in the table of database 606 and the corresponding index entries.

Figure 7:
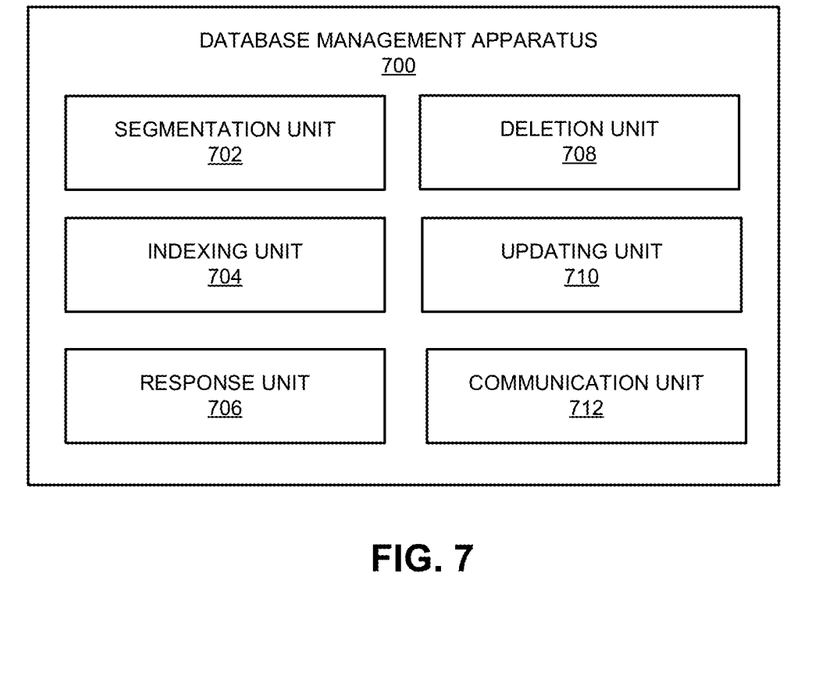
FIG. 7 illustrates an exemplary apparatus that facilitates efficient database indexing for mixed data types, in accordance with an embodiment of the present application.

FIG. 7 illustrates an exemplary apparatus that facilitates efficient database indexing for mixed data types, in accordance with an embodiment of the present application. Database management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can include units 702-712, which perform functions or operations similar to modules 620-630 of computer system 600 of FIG. 6, including: a segmentation unit 702; an indexing unit 704; a response unit 706; a deletion unit 708; an updating unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating efficient indexing in a database, comprising:
   maintaining, by a database system, a data table in the database, wherein the data table includes a first column for structured data supported by the database system and a second column for unstructured text, and wherein a first row of the data table includes a first piece of data in the first column and a second piece of data in the second column;
   in response to the first row being generated, performing word segmentation on the second piece of data to generate a first set of semantically meaningful word segments, wherein a respective semantically meaningful word segment comprises a combination of one or more phrases from unstructured text in the second piece of data;
   generating, in an index table of the database, a set of index entries that points to the first row, wherein each index entry of the set of index entries comprises an index generated using the first piece of data stored in the first column of the first row, and wherein a respective index entry of the set of index entries comprises a corresponding word segment of the first set of semantically meaningful word segments; and
   in response to receiving a query to the database for the unstructured text, looking up, by the database system, a response to the query based on the index table.

2. The method of claim 1, wherein the set of index entries is stored in corresponding rows of the index table of the database.

3. The method of claim 1, wherein the data table further includes a third column for a primary key of the data table, and wherein a respective index entry of the set of index entries further corresponds to a third piece of data of the third column of the first row.

4. The method of claim 1, further comprising:
   determining a piece of structured data and an unstructured text phrase from the query;
   performing word segmentation on the unstructured text phrase to generate a second set of semantically meaningful word segments;
   determining query keys for the query by querying the index table based on a combination of the piece of structured data and a respective word segment of the second set of semantically meaningful word segments; and
   obtaining a query response from the database by locating one or more rows corresponding to the query keys in the data table.

5. The method of claim 4, wherein determining the query keys further comprises:
   obtaining a plurality of sets of lookup keys from the set of index entries, wherein a respective set of lookup keys corresponds to the piece of structured data and a corresponding word segment of the second set of semantically meaningful word segments; and
   obtaining the query keys by determining an intersection of the plurality of sets of lookup keys.

6. The method of claim 1, further comprising updating the first row of the data table with a new piece of data for the first column by:
   deleting a respective index entry of the set of index entries;
   generating, in the index table, a second set of index entries that points to the first row, wherein each index entry of the second set of index entries comprises an index generated from the new piece of data and wherein a respective index of the second set of index entries includes a corresponding word segment of the first set of semantically meaningful word segments; and
   updating the first row with the new piece of data in the first column.

7. The method of claim 1, further comprising updating the first row of the data table with a new piece of data for the first column and a new phrase of unstructured text for the second column by:
   deleting a respective index entry of the set of index entries;
   performing word segmentation on the new phrase of unstructured text to generate a third set of semantically meaningful word segments;
   generating, in the index table, a third set of index entries that points to the first row, wherein each index entry of the third set of index entries comprises an index generated from the new piece of data, and wherein a respective index of the third set of index entries includes a corresponding word segment of the third set of semantically meaningful word segments; and
   updating the first row with the new piece of data in the first column and the new phrase of unstructured text in the second column.

8. The method of claim 1, further comprising deleting the first row of the data table by:
   deleting a respective index entry of the set of index entries; and
   deleting the first row from the data table.

9. The method of claim 1, wherein the second column is a target column that is accessed by most queries to the data table of the database.

10. The method of claim 1, wherein the database stores data associated with an online transaction processing (OLTP) service, and wherein the data table includes transaction records of the OLTP service.

11. A non-transitory computer-readable storage medium storing instructions that when executed by a computer, cause the computer to perform a method for facilitating efficient indexing in a database, the method comprising:
   maintaining a data table in the database, wherein the data table includes a first column for structured data and a second column for unstructured text, and wherein a first row of the data table includes a first piece of data in the first column and a second piece of data in the second column;
   in response to the first row being generated, performing word segmentation on the second piece of data to generate a first set of semantically meaningful word segments, wherein a respective semantically meaningful word segment comprises a combination of one or more phrases from unstructured text in the second piece of data;

generating, in an index table of the database, a set of index entries that points to the first row, wherein each index entry of the set of index entries comprises an index generated using the first piece of data stored in the first column of the first row, and wherein a respective index entry of the set of index entries comprises a corresponding word segment of the first set of semantically meaningful word segments; and in response to receiving a query to the database for the unstructured text, looking up, by the database system, a response to the query based on the index table.

12. The non-transitory computer-readable storage medium of claim 11, wherein the set of index entries is stored in corresponding rows of the index table of the database.

13. The non-transitory computer-readable storage medium of claim 11, wherein the data table further includes a third column for a primary key of the data table, and wherein a respective index entry of the set of index entries further corresponds to a third piece of data of the third column of the first row.

14. The non-transitory computer-readable storage medium of claim 11, wherein the method further comprises:
determining a piece of structured data and an unstructured text phrase from the query;
performing word segmentation on the unstructured text phrase to generate a second set of semantically meaningful word segments;
determining query keys for the query by querying the index table based on a combination of the piece of structured data and a respective word segment of the second set of semantically meaningful word segments; and
obtaining a query response from the database by locating one or more rows corresponding to the query keys in the data table.

15. The non-transitory computer-readable storage medium of claim 14, wherein determining the query keys further comprises:
obtaining a plurality of sets of lookup keys from the set of index entries, wherein a respective set of lookup keys corresponds to the piece of structured data and a corresponding word segment of the second set of semantically meaningful word segments; and
obtaining the query keys by determining an intersection of the plurality of sets of lookup keys.

16. The non-transitory computer-readable storage medium of claim 11, wherein the method further comprises updating the first row of the data table with a new piece of data for the first column by:
deleting a respective index entry of the set of index entries;
generating, in the index table, a second set of index entries that points to the first row, wherein each index entry of the second set of index entries comprises an index generated from the new piece of data, and wherein a respective index of the second set of index entries includes a corresponding word segment of the first set of semantically meaningful word segments; and
updating the first row with the new piece of data in the first column.

17. The non-transitory computer-readable storage medium of claim 11, wherein the method further comprises updating the first row of the data table with a new piece of data for the first column and a new phrase of unstructured text for the second column by:
deleting a respective index entry of the set of index entries;
performing word segmentation on the new phrase of unstructured text to generate a third set of semantically meaningful word segments;
generating, in the index table, a third set of index entries that points to the first row, wherein each index entry of the third set of index entries comprises an index generated from the new piece of data, and wherein a respective index of the third set of index entries includes a corresponding word segment of the third set of semantically meaningful word segments; and
updating the first row with the new piece of data in the first column and the new phrase of unstructured text in the second column.

18. The non-transitory computer-readable storage medium of claim 11, wherein the method further comprises deleting the first row of the data table by:
deleting a respective index entry of the set of index entries; and
deleting the first row from the data table.

19. The non-transitory computer-readable storage medium of claim 11, wherein the second column is a target column that is accessed by most queries to the data table of the database.

20. The non-transitory computer-readable storage medium of claim 11, wherein the database stores data associated with an online transaction processing (OLTP) service, and wherein the data table includes transaction records of the OLTP service.

* * * * *